United States Patent
Komroff et al.

[15] 3,635,001
[45] Jan. 18, 1972

[54] FILTER INDICATOR

[72] Inventors: Paul Komroff, Union, N.J.; Harper Landell, Fort Washington, Pa.

[73] Assignee: National Union Electric Corporation, Jersey City, N.J.

[22] Filed: Aug. 5, 1969

[21] Appl. No.: 847,672

[52] U.S. Cl. ................................................55/274, 55/385
[51] Int. Cl. ..............................................B01d 27/00
[58] Field of Search..................................55/274–275, 1 C,
55/501, 270; 62/125, 129, 127, 262; 210/85, 94–95; 40/2, 137; 73/38; 161/6

[56] References Cited

UNITED STATES PATENTS

| | | | |
|---|---|---|---|
| 2,789,663 | 4/1957 | Camp | 55/DIG. 31 |
| 2,998,711 | 9/1961 | Komroff | 62/262 |
| 3,024,655 | 3/1962 | Dwyer et al. | 73/38 |
| 3,456,043 | 7/1969 | Emery | 161/6 |
| 3,509,697 | 5/1970 | Dewey et al. | 62/262 |
| 2,548,942 | 4/1951 | Brown | 55/501 |
| 2,613,454 | 10/1952 | White | 55/274 |
| 2,849,005 | 8/1958 | Tucker et al. | 131/263 |
| 2,965,197 | 12/1960 | Dow et al. | 55/DIG. 31 |
| 3,201,772 | 8/1965 | Ladusaw | 55/274 X |
| 3,323,319 | 6/1967 | Graser | 62/262 |

FOREIGN PATENTS OR APPLICATIONS

| | | | |
|---|---|---|---|
| 468,084 | 6/1937 | Great Britain | 55/274 |
| 675,156 | 10/1929 | France | 55/1 C |

Primary Examiner—Frank W. Lutter
Assistant Examiner—Bernard Nozick
Attorney—Darby and Darby

[57] ABSTRACT

An air conditioner filter indicator located behind and in contact with the filter causes indication of the need for cleaning the filter as the filter becomes dirt laden. A legend such as the words "WASH ME" formed as part of the indicator is transferred to the filter since no dirt will collect on the filter portion in contact with the legend, and contrast increases between that portion and the dirt-collecting portion of the filter. In another embodiment, the indicator including a legend such as "WASH ME" is placed on the front surface of the filter and originally is of the same color as the filter. Increasing contrast between filter and indicator as the filter becomes dirt laden causes the legend to become visually prominent. The words "WASH ME" in both embodiments serve to remind the operator to clean or change the filter.

2 Claims, 5 Drawing Figures

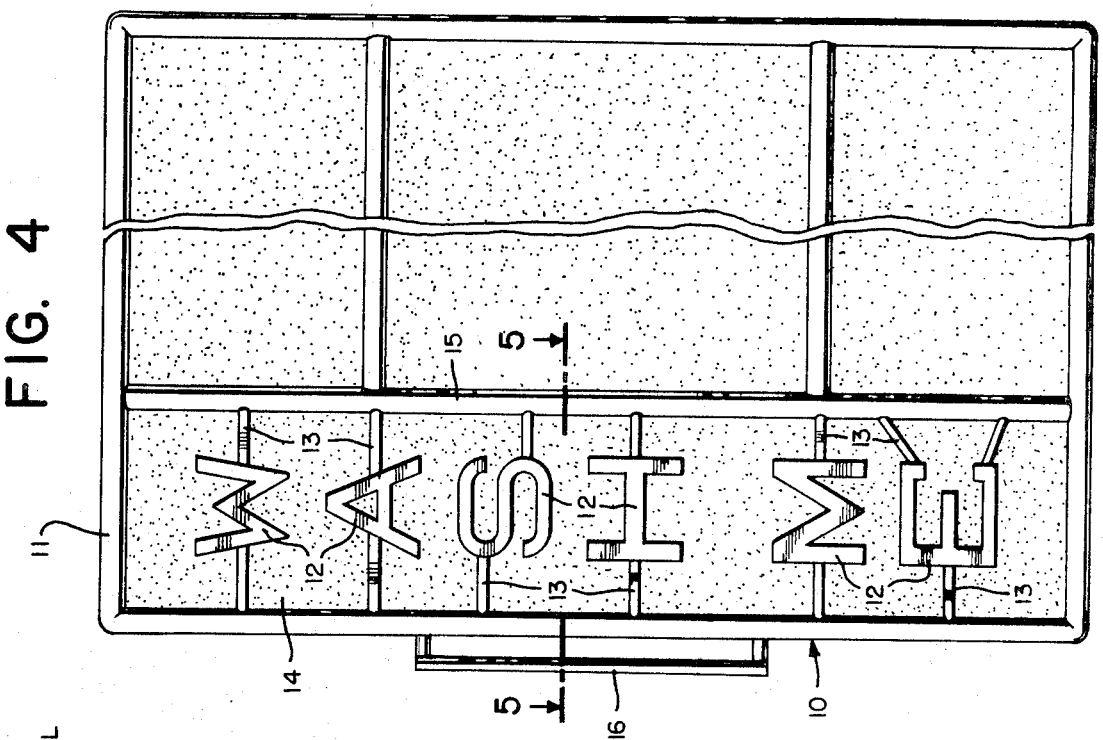
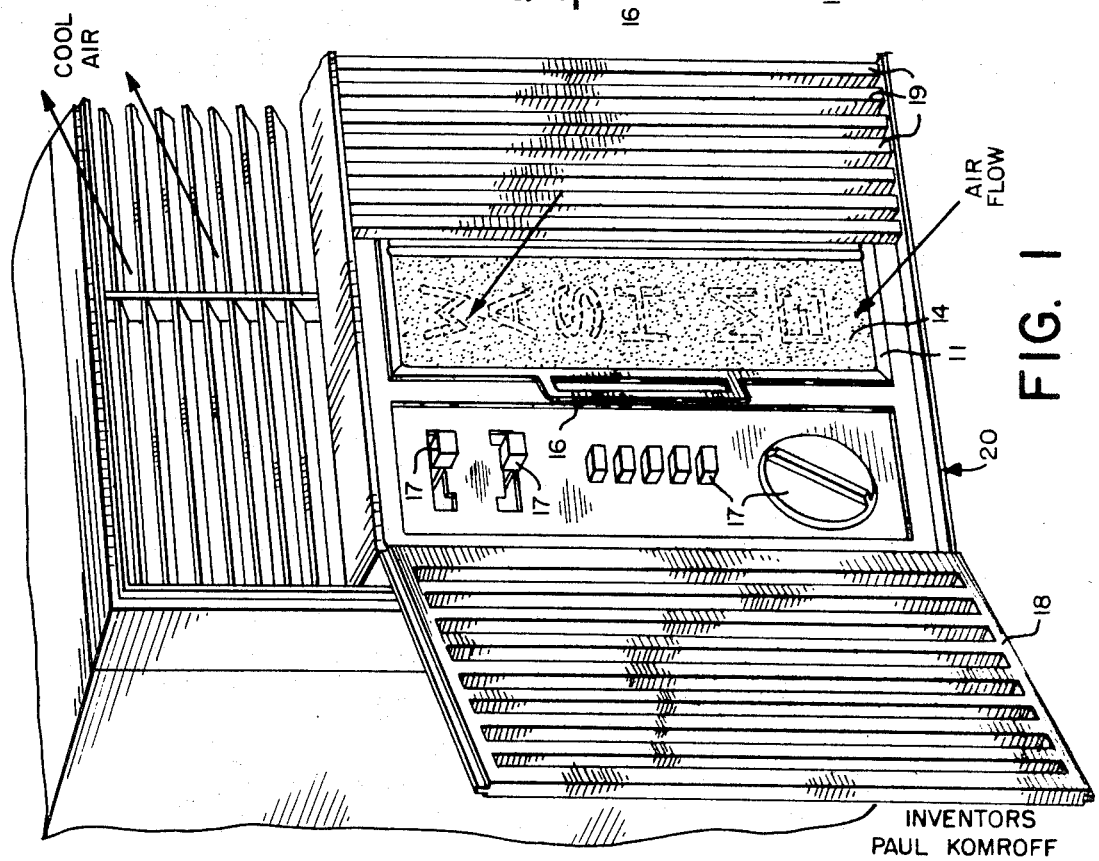

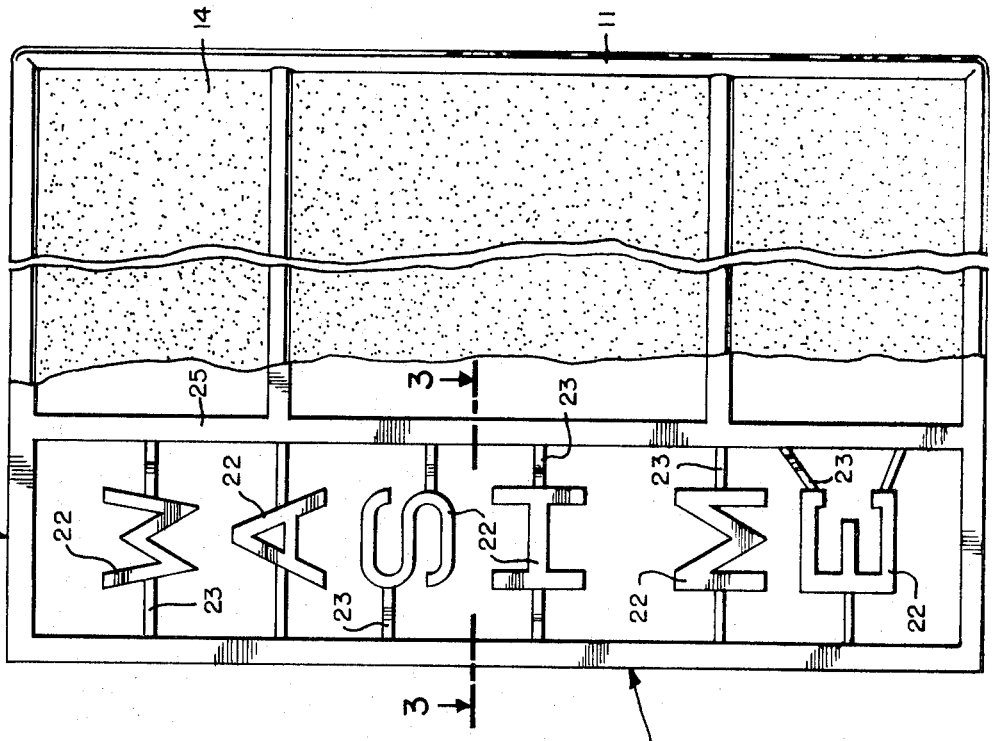
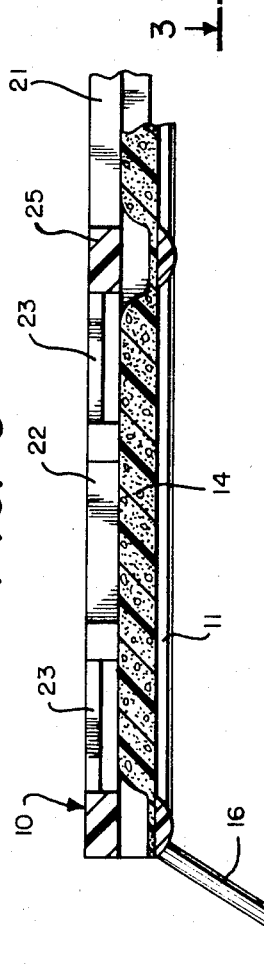
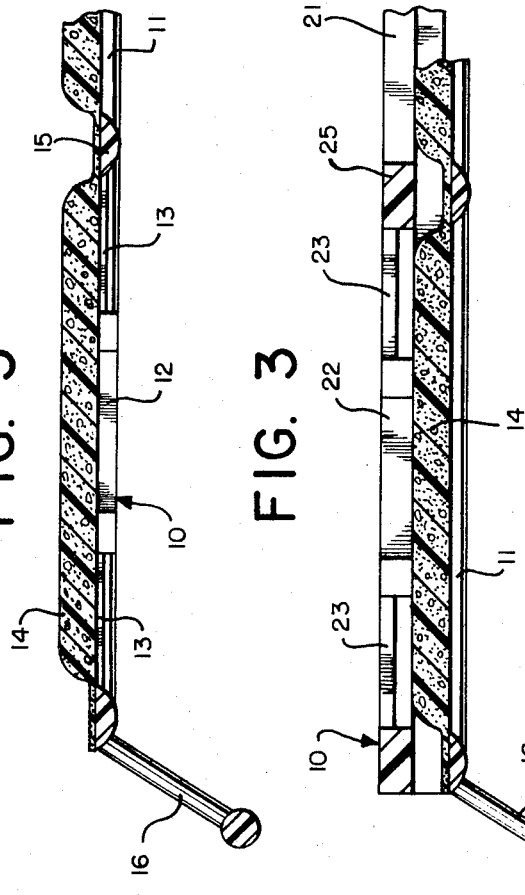

FILTER INDICATOR

This invention relates to indicators and, more particularly, to indicators for filters used in air conditioners or other fluid-handling systems.

In prior art air conditioning units, the filter elements are usually behind front panels which must be removed entirely to determine whether the filter needs cleaning. Other types of air conditions have filters which are insertable in a slot adjacent to an air intake port. Such filters must similarly be removed completely to inspect for cleaning. Both types of filter inspection are most annoying to the operator, particularly when it is found that the filter does not need cleaning. In addition, there is a strong probability that the filter will go uncleaned for longer periods of time than is desirable, because what is "out of sight" is frequently "out of mind."

It is an object of this invention, therefore, to provide an indicator for the condition of a filter for an air conditioner or the like which may be observed without necessitating removal of the filter.

It is another object to provide an indicator for the condition of such a filter which conveys an intelligible reminder to clean the filter in addition to merely indicating the condition requiring cleaning.

It is also an object of the present invention to indicate the condition of and convey a reminder to clean a filter for an air conditioner whenever the air conditioner controls are used.

It is a further object to provide an indicator for the condition of an air conditioner formed as part of the retaining frame for the filter which normally prevents contact between filter and cooling coils.

It is additionally an object to provide an indicator for the condition of an air conditioner filter which is part of a holding frame for the filter so that filter and holding frame form a single unit for easy insertion in and removal from the air conditioner.

In a preferred embodiment of the invention, a filter arrangement for indicating the condition of a filter in an air conditioner comprises a filter contained within said air conditioner for filtering a stream of impure air, and an indicating element contained within the air conditioner and with the filter juxtaposed to and drawn against the indicating element by the airstream. The indicating element is made of air-impervious material and has a recognizable memory-provoking form for preventing air passage through filter portions in contact with the indicating element while allowing air passage through the noncontacted filter portions. Continued operation of the air conditioner causes the noncontacted filter portion to darken, and increasing contrast between the darkened and undarkened filter portions results in the assumption by the filter of the recognizable memory-provoking form, which becomes visually prominent, thereby providing reminder of the condition of the filter.

In an alternate embodiment of the invention, a filter arrangement for indicating the condition of a filter in an air conditioner comprises a filter contained within said air conditioner, for filtering impure air and having an original color when clean which changes in normal use, and an indicating element, contained within the air conditioner and positioned against the surface of the filter and made of air-impervious material of a color similar to the filter and having a recognizable memory-provoking form with predetermined openings included in the indicating element to permit visibility of a portion of the filter through the element. Continued filtering of impure air causes a change in color of the filter, and the resultant increasing contrast between indicating element and filter causes the recognizable memory-provoking form to become visually prominent thereby providing reminder of the condition of the filter.

For a better understanding of the present invention, together with other and further objects thereof, reference is made to the following description taken in connection with the accompanying drawing, and the scope of the invention will be pointed out in the appended claims.

In the drawings:

FIG. 1 shows a front perspective view of a portion of an air conditioner utilizing a filter indicator of a preferred embodiment of the invention.

FIG. 2 illustrates a partially broken away enlarged face view of the preferred embodiment of FIG. 1.

FIG. 3 shows a partial sectional view taken along 3—3 of FIG. 2 indicating construction details of the filter and retaining frame in this embodiment.

FIG. 4 illustrates an enlarged face view of the filter indicator and filter in an alternate embodiment.

FIG. 5 is a partial sectional view taken along 5—5 of FIG. 4 showing construction details of the filter and filter holding frame.

Referring first to FIG. 1, an air conditioner 20 which may be used in connection with the present invention is shown. The air conditioner 20 typically has a front panel consisting of a stationary portion 19 and an access door 18. Both door 18 and stationary portion 19 have openings to permit passage of air. When door 18 is closed, the front panel presents a unified, uncluttered appearance with all operating controls out of sight. Access to the controls 17 is obtained by opening door 18. As shown in the figure, not only are the controls 17 exposed when door 19 is open, but a portion of the filter 14 is also exposed. It is this exposed filter portion that is used to indicated condition of the filter and provide reminder to clean the filter in accordance with the present invention.

Ordinarily filter 14 is provided with a handle 16 connected to the filter holding frame 11 which is used to remove the filter from the air conditioner 20. The filter and frame slide out of the air conditioner.

In most recirculating air conditioners, the air is drawn into the air conditioner from the room. The airflow direction is therefore through filter 14 in the direction indicated in FIG. 1. Behind filter 14 are the cooling coils which are not shown.

In many air conditioners, disposed between the filter 14 and cooling coils is a retaining frame which prevents the filter from being drawn against the air conditioner coils by the airstream. If the filter were allowed to touch the coils, condensed moisture on the coils would wet the filter, causing poorer air circulation and reduced cooling effect.

A preferred embodiment of the present invention including a novel use of this retaining frame will be described in connection with FIGS. 2 and 3. Referring first to FIG. 2, a filter indicating element 10 is shown, having letters 22, supporting members 23 for letters 22, supporting column 25, and a partially shown retaining frame 21. It can be seen that the letters 22 spell out the words "WASH ME," which is a recognizable memory-provoking form. Clearly any legend or indicia suggestive of need for cleaning or changing the filter may be used instead of the words "WASH ME."

The retaining frame 21, including the indicating element 10, is disposed between the filter 14 and the air conditioner cooling coils (not shown) in contact relationship with filter 14. The force of the airstream further presses the filter 14 against the retaining frame 21. The legend portion of said frame 21 is composed of an air-impervious material and is in direct contact with the filter. Airflow will thus be directed through the filter portions not in contact with the legend and substantially no air will be able to flow through that portion of the filter in contact with the legend.

Continued operation of the air conditioner will result in deposition of contaminants on the filter portions through which air is able to pass, causing those portions to darken. The portion of the filter in contact with the legend will remain substantially the original color. The effect of increasing contrast between those portions as the filter becomes dirtier, causes the filter to assume the recognizable memory-provoking form of the legend; with the legend shown in FIG. 1, filter 14 will display the words "WASH ME." A viewer seeing these words will therefore be reminded that the filter is dirty and needs cleaning.

FIG. 3 illustrates the indicating element 10 of the retaining frame 21 in contact with the filter assembly consisting of filter 14 and its holding frame 11. The letter-supporting members 23 as shown are not in contact with the filter 14 in order to make the legend more prominent.

The entire retaining frame 21 including support members 23 could, on the other hand, be constructed of uniform thickness, which would be a more economical fabrication technique; however, it would result in contact between the support members 23 and the filter 14 and therefore the form of the support members would similarly transfer to the filter. This construction would make the legend slightly less distinct but nevertheless still intelligible.

The retaining frame 21 including the indicating element 10 is typically made of a plastic material, polyethylene for example, or any other air-impervious material. This frame may be molded by injection molding techniques; however, any of a number of suitable fabrication techniques will suggest themselves to those skilled in the art.

The filter portion 14 may be fabricated as a plastic moss or foam structure; however, other types of filters may be advantageously used where desired. Wire mesh or perforated sheet material are among possible well-known forms.

While the previous description considered airflow that is directed as indicated in FIG. 1, an air conditioner constructed to cool outside air directly and transmit the cooled air through the indicating element in the opposite direction is also within the scope of this invention.

Referring now to FIGS. 4 and 5, an alternate embodiment of this invention is illustrated. In this form of the invention, the indicating element 10 is formed as part of a holding frame 11 for the filter on the front surface of the filter (the surface facing into the room). The indicating element 10, having a recognizable memory-provoking form, includes letters 12, their supporting members 13, supporting column 15, and a part of the filter-holding frame 11. The letters 12 spell out the words "WASH ME"; however, again, any legend or indicia may be used.

A portion of the filter 14 to be monitored shows through the predetermined openings formed within and surrounding the letters 12 and the frame 11 and column 15. Letters 12 are made of an air-impervious material and of a color initially similar to the filter 14 itself. It has been found that a light color (such as light green) yields favorable results but this is not meant to limit the applicability of the invention.

Since the letters 12 are placed against a background surface of similar color (in this case filter 14) when the filter 14 is clean, letters 12 and therefore the words "WASH ME" are practically invisible. As the air conditioner is used, the contaminants in the air passing through the filter will be deposited on the filter causing it to darken. The air-impervious letters 12, however, will remain their original color. Thus, as the filter 14 becomes dirt laden, the contrast with the indicating element becomes more noticeable. The viewer will now see the words "WASH ME" most prominently which should remind him that the filter needs cleaning.

Referring to FIG. 5, a cross section of a typical construction of filter-holding frame 11 and filter 14 is shown. The filter is usually made of a plastic moss or foam structure and may be attached to holding frame 11 in any number of methods. A preferred method is to juxtapose the filter against the retaining frame and to apply heat and pressure to the filter against the frame. This results in some melting of the filter structure onto the frame itself to form a very strong bond between frame and filter. FIG. 5 indicates the depressions formed in the filter at the regions of filter contact with the frame by this method. This technique creates an integral frame assembly, including frame, indicating element and filter.

In this embodiment, the integral frame assembly serves advantageously in that indicator and filter are washed simultaneously to assure removal of any slight dirt accumulation on the frame so that filter and indicator are both restored to their original colors.

A variation of this embodiment would use transparent and colorless air-impervious material as the indicating element, so that initially no contrast is seen between indicating element and filter. In this version, the letters 12 are desirably flush against the filter 14 so that no air can pass beneath the letters. Then, as the exposed portion of the filter becomes dirty, the unexposed portion beneath the letters will become visually prominent.

It is also possible to form the indicating element forming part of the holding frame 11 with the legend on the cooling coil surface of the filter. This arrangement would function similar to the preferred arrangement described in connection with FIGS. 2 and 3.

In any of the described embodiments, when the words "WASH ME" become visually prominent, they will be seen whenever the controls are used. The filter 14 is then slid out of the air conditioner along tracks in the air conditioner housing. The filter 14 and holding frame 11 must be somewhat flexible to enable the frame to bend as it is removed in order to clear access door 18 as shown in FIG. 1.

Other door arrangement, such as two doors opening outwardly from the center, would similarly provide the requisite filter visibility at the time the controls are used, and this invention is therefore not limited to the arrangement shown in FIG. 1.

While there has been described what is at present considered to be the preferred embodiments of this invention, it will be obvious to those skilled in the art that various changes and modifications may be made therein without departing from the spirit of the invention and it is, therefore, aimed to cover all such changes and modifications as fall within the true spirit and scope of the invention as defined herein.

We claim:

1. A filter for indicating the condition of a filter in an air conditioner comprising:
    a sheet of filter medium for filtering a stream of impure air, said sheet having an inside surface and an outside surface;
    a retaining frame surrounding and supporting said sheet of filter medium;
    and indicia elements made of impervious material including pervious portions forming part of the retaining frame and positioned behind the filter sheet and in contact with the inside surface of said sheet, said indicia elements forming letters which appear on the outside surface of said filter sheet during filtration and after the filter becomes dirty, indicating need to clean said filter sheet.

2. The filter of claim 1 wherein said filter is disposed in an air conditioner casing at the inlet and having a plurality of operating controls wherein the portion of the filter sheet on which said letters appear is adjacent to said operating controls.

* * * * *